March 14, 1961  F. W. HAGERTY  2,975,092
METHOD OF FORMING JOINTS
Filed Oct. 17, 1957
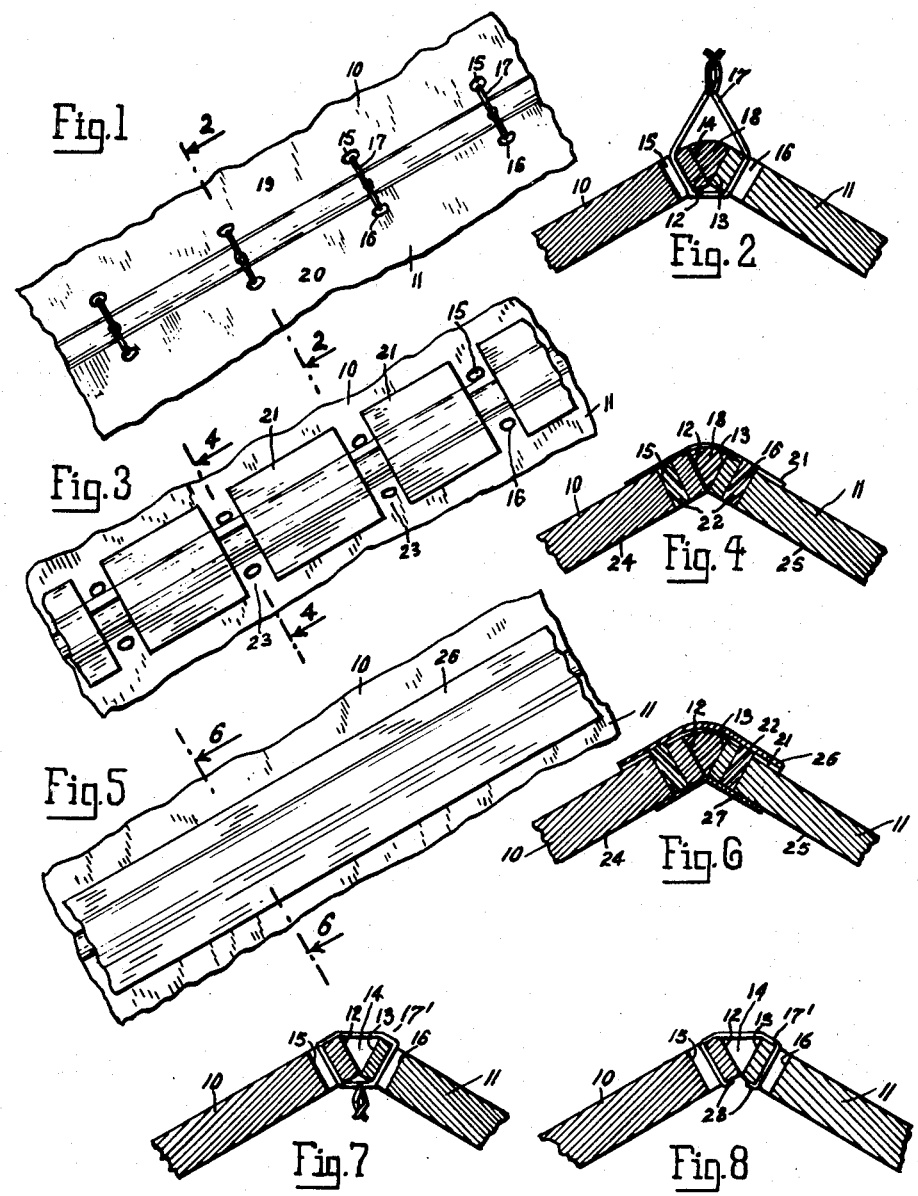
INVENTOR:
Francis W. Hagerty
BY Sigmund Herzog
attorney.

United States Patent Office 2,975,092
Patented Mar. 14, 1961

2,975,092

METHOD OF FORMING JOINTS

Francis W. Hagerty, 355 Atlantic Ave., Cohasset, Mass.

Filed Oct. 17, 1957, Ser. No. 690,777

7 Claims. (Cl. 154—116)

The present invention relates to a method of forming joints between plate members meeting at an angle. In referring to "plate members," it is to be borne in mind that this term is to be regarded as descriptive of any comparatively thin, flat, extended rigid body, such as a board of solid wood, plywood, vulcanized fiber, plastic or the like, and metal plates.

The invention is applicable to the construction of small boats, containers, housings and enclosures generally, furniture, and, in fact, to any other kind or class of articles of manufacture wherein angular joints are to be formed between plate members.

Broadly speaking, the main object of the invention is to provide a method of joining angularly extended plate members without the use of nails, screws or other like fastening devices, the improved joint being leak-proof, so that, when employed in the construction of small boats, caulking operation will not be required, nor will it be necessary periodically to repair or otherwise condition the boat for use, especially when it has been out of the water for some period of time.

Another object of the invention is to provide a joining method which lends itself to the production of articles of manufacture without the employment of skilled labor required normally in the construction thereof or, in other words, which facilitates the setting up of kits, that is to say the entire set of plate members furnished to make up an article, by people having little or no skill at all in the trade which normally manufactures the article.

A further object of the invention is to provide a method of producing joints which considerably reduces the cost of the articles of manufacture produced by the employment of said method.

A still further object of the invention is the provision of an improved method of the character above referred to which greatly reduces the time ordinarily needed for assembling the elements of the article of manufacture and, thus, at a cost comparing favorably with that of articles produced by processes now in vogue.

Still another object of the invention is the provision of an improved method of joining plate members, the joint obtained being of sufficient strength to withstand heavy strains but at the same time having a minimum of weight, Other and more detailed objects of the invention will become more apparent as the nature of the invention is better understood from the following description of the novel method.

Generally speaking, the invention involves the initial joining of the plate members at the desired angular relation by temporary retaining means and application to one of the faces of said plate members of short strips impregnated with a suitable liquid plastic material; removing said temporary retaining means after said strips have been rendered effective to hold said plate members in the required position relative to one another; and thereafter affixing strips of suitable sheet material to one or, preferably, both faces of said plate members; said last-mentioned strips being interconnected by plastic material extending through perforations in said plate members in which said temporary retaining means were originally disposed.

The invention may more clearly be understood from the following detailed description of the embodiments of the invention illustrated in the accompanying drawings, in which:

Figures 1, 3 and 5 are perspective views of angularly disposed plate members with the method of forming the joint depicted in several successive steps;

Fig. 2 is a section taken on line 2—2 of Fig. 1, on a larger scale;

Fig. 4 is a similar section taken on line 4—4 of Fig. 3;

Fig. 6 is a similar section taken on line 6—6 of Fig. 5;

Fig. 7 is a similar section of a modified construction obtained by a modified process; and Fig. 8 is a similar section of said modified construction in a further stage of said modified process.

Referring now first to Figs. 1 to 6, inclusive, of the drawings, the plate members to be joined are denoted by the numerals 10 and 11. These members are extended at the desired angle to one another with the corresponding edges of their opposite end faces 12 and 13, respectively, in contact with one another, whereby a groove 14 is formed by said end faces. In the initial stage of the process, the plate members may be held in position by angle boards, if desired. The plate members are provided with suitably spaced bores 15 and 16, respectively, the set of bores 15 registering with the set of bores 16. For temporarily maintaining the plate members in their angular position, retaining means are provided, for instance wires 17, drawn through sets of registering bores 15 and 16 and twisted, or otherwise manipulated, to act as clamps (Figs. 1 and 2).

In the next step of the process, the groove 14 is filled with a suitable plastic material 18, the exposed faces 19 and 20 of the plate members 10 and 11, respectively, coated on areas extending beyond the bores 15 and 16 with a liquid plastic, after which short retaining strips 21 of woven or other sheet material, for instance fiber glass impregnated with plastic material, are applied to said coated areas. The strips are of a length to leave the bores 15 and 16 exposed (Figs. 3 and 4). Each strip is of sufficient width to extend over the plastic material 18 in the groove 14 and to cover the coated areas on both plate members 10 and 11 throughout the length of the strip.

After the plastic material 18 has solidified and the strips 21 have been firmly united with the plate members 10 and 11 by reason of the plastic coating having set, and the said plate members are thereby fixed in the desired angular relation, the temporary retaining means are removed from the structure.

The bores 15 and 16 are thereupon filled with a suitable plastic material 22, extending the same, preferably, into the plane of the strips 21 (Fig. 4). The strips 21, the intermediate exposed plate member sections 23 and the corresponding underface sections 24 and 25 of the plate members are then coated with a liquid plastic. Strips 26 and 27 of a material, preferably, identical with that of the short strips 21, are then applied to the coated sections of the exposed and underfaces of the plate members 10 and 11, the strips 26 covering the short strips 21, the intermediate sections 23 and thus the bores 15 and 16, the strips 27, obviously, covering said bores. Both strips 26 and 27 extend over the entire length of the plate members and contact with the plastic material in the bores 15 and 16, so that, when this material hardens, it forms a firm bond between the covering strips 26 and 27, acting also as anchors which prevent creeping of the strips 26 and 27. The joint is complete as soon as the plastic materials employed have become solid.

It is obvious that the steps of the process herein described may be changed, within the scope of the appended claims, without departing from the spirit of the invention. For instance, the short strips 21 may be applied to the underfaces of the plate members. From then on the sequence of the steps remains the same. Also, the wires 17 may be converted into staples, as shown in Figs. 7 and 8. In such case, the ends of the wires are extended into the bores 15 and 16 from above and twisted below the underfaces of the plate members. After the short strips 21 have been applied to the exposed faces of the plate members and the latter are retained in their final positions, the twisted portions of the wires 17' are cut off and the ends 28 of said wires bent against the underfaces of the plate members, the wires thereby forming permanent staples. The diameter of the wires 17' must be smaller than those of the bores 15 and 16, to permit application of the plastic material thereinto. The process of forming the joint is thence continued in the manner above described.

From the foregoing disclosure of the improved method it is obvious that its application results in several advantages over the methods heretofore employed, namely:

(1) It eliminates or minimizes the employment of strengthening members heretofore used at butt joints between plate members, for instance, in boat constructions.

(2) It makes the use of screws, nails and similar fastening devices superfluous.

(3) It results in a substantially lighter construction by reason of doing away with strengthening members, screws, nails or othere fastening means.

(4) It results, weight for weight, in a stronger product than any previous construction using chine pieces and metal fastenings.

(5) It produces a joint that remains watertight or liquidtight for a considerably longer period of time than those heretofore used, because, obviously, chine pieces swell and contract with changes of their moisture content.

(6) It requires little skill to set up the plate members since beveling or chamfering of the endfaces of the plate members is eliminated.

(7) It takes less time to assemble the plate members, the joint being exceedingly simple, and the assembling operation being adapted to be performed, in many instances, without tools.

(8) It provides a structurally balanced joint attached to both faces of the plate members, in contradistinction to the joints heretofore applied to plate members, wherein the latter are coupled by screws, nails and other like fasteners.

(9) It eliminates the use of building forms, heretofore commonly employed in the construction of, for instance, boats, the cost such forms representing a considerable percentage of the cost of the boat, and such forms being, in most instances, discarded after the completion of the structure.

The term "retaining strip" as used in the appended claims means either a woven or other sheet material treated with a suitable plastic material for co-operation with a coat of liquid plastic material applied to the plate members or a strip of sheet material coated with plastic material which will cause the strip to adhere to the plate members.

What I claim is:

1. The method of forming a joint between angularly extended plate members which comprises providing a row of spaced registering bores throughout the length of said members adjacent the areas thereof where the joint is to be applied; placing the plate members at the selected angular relation with corresponding edges of their end faces into contact with one another; extending temporary retaining means through said bores for maintaining said plate members in the selected angular position; applying retaining strips treated with plastic material to corresponding adjacent faces of said plate members between adjacent sets of bores therein; removing said temporary retaining means from said plate members after the plastic material of said strips has set; filling the bores in said plate members with a plastic material; and applying retaining strips to said plate members throughout the length thereof to cover said bores; the plastic material in said bores forming a binder between said last-mentioned retaining strips.

2. The method of forming a joint between angularly extended plate members which comprises providing a row of spaced registering bores throughout the length of said members adjacent the areas thereof where the joint is to be applied; placing the plate members at the selected angular relation with corresponding edges of their end faces into contact with one another whereby a groove is formed between said end faces; extending temporary retaining means through said bores for maintaining said plate members in the selected angular position; filling said groove with plastic material; applying retaining strips treated with plastic material to corresponding adjacent faces of said plate members between adjacent sets of bores therein; removing said temporary retaining means from said plate members after the plastic material of said strips has set; filling the bores in said plate members with plastic material; and applying retaining strips to said plate members throughout the length thereof to cover the plastic in said groove and said bores; the plastic material in said bores forming a binder between said last-mentioned retaining strips.

3. The method of forming a joint between angularly extended plate members which comprises providing a row of spaced registering bores throughout the length of said members adjacent the areas thereof where the joint is to be applied; placing the plate members at the selected angular relation with corresponding edges of their end faces into contact with one another; extending staples through said bores; applying retaining strips treated with plastic material to corresponding adjacent faces of said plate members between adjacent sets of bores therein; filling the bores in said plate members with a plastic material; and applying retaining strips to said plate members throughout the length thereof to cover said bores; the plastic material in said bores forming a binder between said last-mentioned retaining strips.

4. The method of forming a joint between angularly extended plate members which comprises providing a row of spaced registering bores throughout the length of said members adjacent the areas thereof where the joint is to be applied; placing the plate members at the selected angular relation with corresponding edges of their end faces into contact with one another whereby a groove is formed between said end faces; extending staples through said bores; the diameter of each staple being smaller than that of each bore through which it extended; filling said groove with plastic material; applying retaining strips treated with plastic material to corresponding adjacent faces of said plate members between adjacent sets of bores therein; filling the bores in said plate members with a plastic material; and applying retaining strips to said plate members throughout the length thereof to cover the plastic in said groove and said bores; the plastic material in said bores forming a binder between said last-mentioned retaining means.

5. The method of forming a joint between angularly extended plate members which comprises placing said members at the selected angular relation in contact with one another; extending staples through said members along their line of contact for temporarily maintaining the same in the selected angular position; and applying retaining strips to both faces of said plate members throughout the length thereof to cover the areas adjacent the contacting portions of the same.

6. The method of forming a joint between angularly extended plate members which comprises providing a row of spaced registering bores throughout the length of said members adjacent the areas thereof where the joint is to be applied; placing the plate members at the selected angular position in contact with one another; extending retaining means through said bores for maintaining said plate members in the selected angular position; said retaining means filling said bores only partially; filling the bores in said plate members with plastic material; and applying retaining strips to said plate members throughout the length thereof to cover said bores; the plastic material in said bores forming a binder between said retaining strips.

7. The method of forming a joint between angularly extended plate members which comprises providing a row of spaced registering bores throughout the length of said members adjacent the areas thereof where the joint is to be applied; placing the plate members at the selected angular position in contact with one another; extending staples through said bores; the diameter of each staple being smaller than that of each bore through which it is extended; filling the bores in said plate members with a plastic material; and applying retaining strips to said plate members throughout the length thereof to cover said bores; the plastic material in said bores forming a binder between said retaining strips.

References Cited in the file of this patent
UNITED STATES PATENTS

| | | |
|---|---|---|
| 2,073,665 | Welch | Mar. 16, 1937 |
| 2,140,672 | Gray et al. | Dec. 20, 1938 |
| 2,151,605 | Lavering | Mar. 21, 1939 |
| 2,392,734 | Haberstump | Jan. 8, 1946 |
| 2,509,494 | Gruenwald | May 20, 1950 |
| 2,700,357 | Winter | Jan. 25, 1955 |
| 2,718,485 | Samuely | Sept. 20, 1955 |
| 2,746,891 | Doane | May 22, 1956 |